Figure 1:
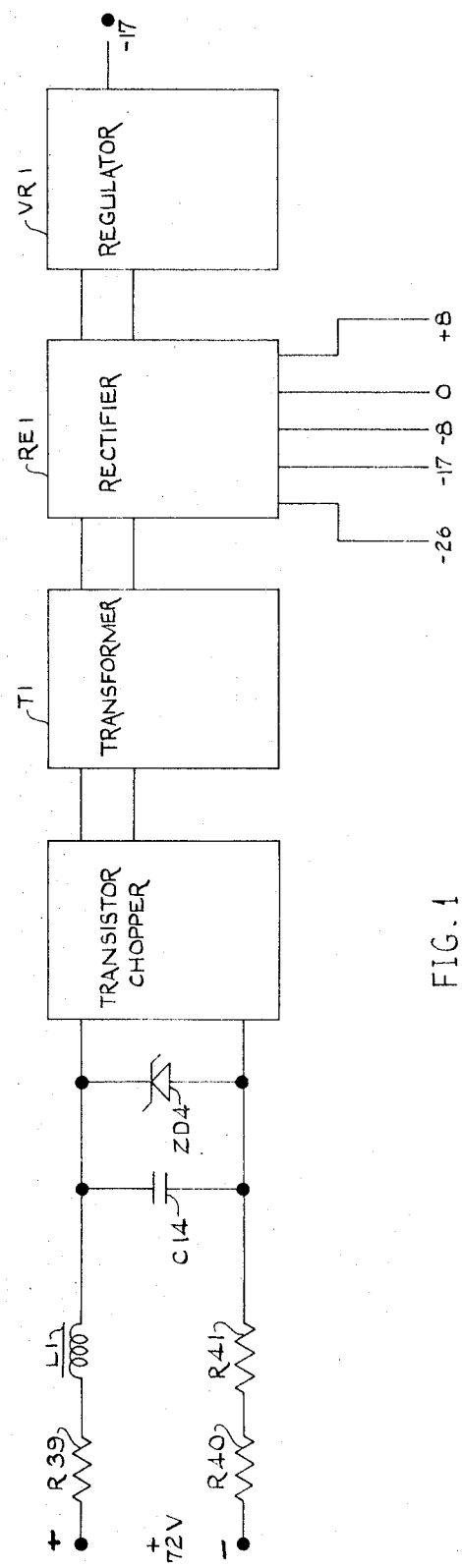

United States Patent

[11] 3,586,957

| [72] | Inventor | George Robert Cass<br>Montreal, Quebec, Canada |
|---|---|---|
| [21] | Appl. No. | 753,138 |
| [22] | Filed | Aug. 16, 1968 |
| [45] | Patented | June 22, 1971 |
| [73] | Assignee | Canadian National Railway Company<br>Montreal, Quebec, Canada |

[54] POWER SOURCE FOR ELECTRONIC CIRCUITRY
3 Claims, 2 Drawing Figs.

[52] U.S. Cl............................................... 321/2,
317/50, 321/11, 321/18, 321/27
[51] Int. Cl...................................................... H02m 3/32,
H02p 13/22, H02h 7/14
[50] Field of Search........................................... 321/2, 11,
18, 27; 317/50

[56] References Cited
UNITED STATES PATENTS
3,063,001 11/1962 White............................ 321/16

| 3,192,464 | 6/1965 | Johnson et al. ............... | 321/2 |
| 3,310,727 | 3/1967 | Flannery ...................... | 321/2 X |
| 3,353,066 | 11/1967 | De Souza...................... | 317/50 X |

OTHER REFERENCES

CQ. "DC to DC Regulated Converters." Vol. 22. No. 5. pp 31, 32. May 1966.

*Primary Examiner*—William H. Beha, Jr.
*Attorney*—Fetherstonhaugh and Co.

ABSTRACT: Electric power from a 72 v. DC supply is applied through protective elements which reduce the effects of voltage surges and transients on succeeding circuitry to a transistor chopper producing an alternating current output which is preferably transformed and rectified and tapped to provide regulated and unregulated supplies. In one alternative the transformer output is fed back to control the voltage input to the transistor chopper.

POWER SOURCE FOR ELECTRONIC CIRCUITRY

This invention relates to the provision of a regulated DC power supply for locomotives.

Although the regulated power supply, herein defined, is useful for any circuits or devices which might, on a railway train, require DC power supplies, some of which are regulated, such power supplies and regulated power supplies are of particular advantage for use with my circuitry for wheel slip detection described in my copending application, Ser. No. 691,669 filed Nov. 21, 1967, and/or for use with my circuitry for a speedometer described in my copending application Ser. No. 767,590 filed Aug. 23, 1968.

It is an object of the invention to provide circuitry designed to derive from a locomotive power supply, a plurality of unregulated and regulated DC voltages usable collectively or selectively, while protecting the terminals carrying such DC voltages of both types and hence circuitry connected to said terminals; from voltage transients and voltage fluctuations due to the use of a megger occurring in said locomotive power supply.

To the best of my knowledge, the circuitry forming the subject matter of this application, and of which two specific alternatives are about to be described, provides the first practical means for providing DC power for electronic circuitry from railway locomotive power while protecting the circuitry from the fluctuations and transients in said power.

Figure 2:
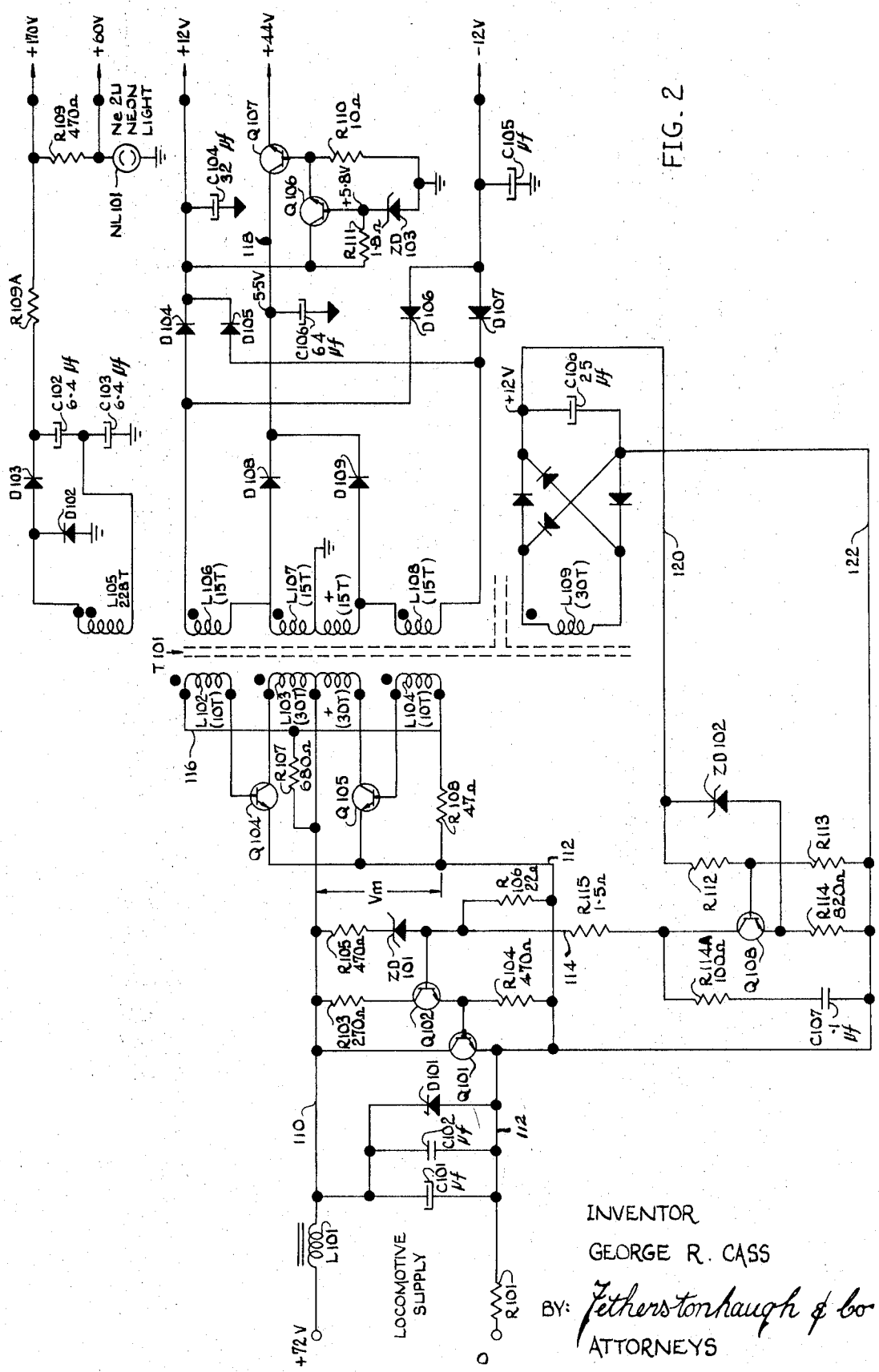

In the drawings:

FIG. 1 schematically indicates one alternative form of power supply circuitry in accord with the invention; and FIG. 2 illustrates an alternative form of power supply circuitry in accord with the invention.

In the past, difficulty was experienced in operating electronic equipment directly from the locomotive battery circuit due to large fluctuations or 'spikes' in the intended DC potentials which occur frequently and may have magnitudes of 1,000 v. or more. In accord with the preferred design of means for the supply of the DC voltages as shown in FIG. 1 the positive lead from the locomotive battery is led to a transistor chopper circuit through resistance R39 and choke coil L1. The negative lead is connected to the transistor chopper circuit through resistances R40 and R41 in series. A condenser C14 and Zener Diode ZD4 are connected in parallel across the positive and negative leads on the side thereof remote from the 72 v. locomotive supply. Zener Diode ZD4 is poled to conduct at low voltage, from the negative to positive leads but at a predetermined higher voltage from the positive to negative and the Zener Diode is chosen in relation to the supply to be continuously conducting. Through the effects of resistors R40 and R41 the choke coil L1, the capacitor C4 and Zener Diode ZD4 shown, any spikes in the supply are substantially eliminated.

The transistor chopper circuit is not shown in detail as in this alternative form of the invention, its form is conventional, its purpose being to provide an alternating current from the DC supply. The alternating current is supplied from the transistor chopper circuit to the primary of a transformer T1. The output of the transformer is rectified at rectifier RE1 and in accord with well-known techniques the rectified output is designed to supply a number of DC voltages, there being shown, for example, the −25, −17, −8, 0 and +8 v. supplies required in the circuitry of the wheel slip detector covered in my copending application, Ser. No. 691,669 filed Nov. 21, 1967. An output is also taken from the rectifier to a voltage regulator VR1. The voltage regulator is used to produce precisely regulated voltages on whose precision the proper operation of electronic solid-state circuitry may depend.

The purpose of the transformer T1 is to isolate the electronic circuitry from the locomotive battery lines permitting a megger to be used on the locomotive wiring without requiring disconnection of the wheel slip detector.

In the description and the claims herein, with reference to power for the electronic circuitry, reference is made to the use of the 'direct current' power from the locomotive. It will be understood that this terminology includes the situation where alternating current is obtained from the locomotive supply then rectified, and the circuitry hereafter described connected thereto.

It will be realized that the means for supplying DC potentials, above described, is available for use with electronic or electric circuitry which it is desired to use on the same locomotive or train.

It will further be realized that the voltage values indicated may be varied in any desired manner to provide the proper voltages for DC loads to be used therewith.

In FIG. 2 is shown an alternative embodiment of the invention wherein the circuitry described was developed for use with the speedometer described in application Ser. No. 767,590 filed Aug. 23, 1968, but is available and useful for other DC power supply applications, occurring on a train and with changes of the herein specified DC voltages where different voltages are required for different purposes.

A number of features of the device illustrated in FIG. 2 are improvements over the circuitry described in FIG. 1. As with the circuitry of FIG. 1, the input circuitry provides transient protection and isolation from locomotive ground, through a transformer. A transistor chopper circuit is provided for the same purpose as described in the embodiment of FIG. 1 but with modifications, as described, over the conventional transistor chopper design, to assure the start of oscillation, even under heavy loads. Other features and advantages of the circuitry of FIG. 2 over that of FIG. 1 will be discussed during the specific description of the circuitry of FIG. 2.

FIG. 2 shows the power supply for the electronic equipment in accord with the invention.

Line 110 is connected to the positive voltage terminal of the +72 v. DC locomotive supply through series inductor L101. Line 112 is connected to the OV terminal of the 72 v. locomotive supply through series resistor R101.

Line 110 is connected to line 112 through condenser C101, condenser C102 and diode D101 in parallel, with the diode being poled to conduct for potentials higher on line 112 than on line 110.

An NPN transistor Q101 has its collector connected to line 110 and its emitter connected to line 112. An NPN transistor Q102 has its collector connected to line 110 through resistance R103 and its emitter connected to the base Q101 and also to line 112 through the resistance R104. Line 110 is connected to line 112 through a resistance R105, a Zener Diode ZD101 and a resistance R106 in series, with the Zener Diode ZD101 being poled to provide its design voltage drop when line 110 is of sufficiently higher potential than the junction between ZD101 and R106. The said junction is connected to the base of Q102 and also to a line 114 for a purpose to be hereinafter specified.

The primary of an isolating transformer T101 is comprised of coils L102, L103 and L104 with the relative polarities of the coils under varying voltage conditions in the primary, indicated by the dots at one end of the coils; and with the coils 102 and 104 arranged on opposite ends of coil L103.

Line 110 is connected to a center tap in coil L103. The dotted end of coil L103 is connected to the collector of NPN transistor Q104. The other end of coil L103 is connected to the collector of NPN transistor Q105. Line 112 is connected to the emitters of transistors Q104 and Q105. The base of Q104 is connected to the nondotted end of coil L102; while the dotted end of coil L102 is connected to the nondotted end of coil L104 along a line 116. The dotted end of coil L104 is connected to the base of Q105. Line 116 is connected to line 110 through a larger resistance R107 (here preferably 680Ω) and to line 112 through a smaller resistance R108 (here 47Ω). The values of resistance and of other elements suggested are not intended to be limiting and are selected to ensure that the transistor bases are initially raised to a potential at which one of transistors Q104 and Q105 will begin to conduct to start a 'chopping' action where current is alternatively directed from the center tap connected to line 110 to the other ends of coil L103.

The secondary of transformer T101 comprises coils L105, L106, L107, L108 and L109. Coil L105 is, at one end, connected to ground through a diode D102 poled to conduct when said one end is at lower potential than ground. Condensers C102 and C103 along with diodes D102 and D103 comprise a voltage doubler which rectifies the alternating voltage present at the ends of coil L105 and doubles it to provide a +170 v. DC outlet.

The connection between diode D102 and the voltage doubler is connected to form a 170 v. output line through a resistance R109A. The 170 v. line is connected through a resistance R109, and a neon light NL101 in series to ground. The connection between R109 and NL101 is tapped to provide a 60 v. outlet.

Coils L106 and L108 are located on opposite sides of coil L107. The ends of coils L106 and L108 electrically remote from coil L107 are each connected to provide a nominal +12 v. bus through the rectifying diodes D104 and D105 respectively, with the diodes being respectively poled to conduct when their potentials alternatively go 12 v. positive with respect to ground. The +12 v. bus has a capacitor C104 connected between it and ground for "smoothing" of the rectified square wave.

The ends of coils L106 and L108 electrically remote from coil L107 are each connected to provide a nominal −12 v. outlet through rectifying diodes D106 and D107 respectively, with the diodes being poled to conduct when the transformer windings alternatively go negative with respect to ground. The −12 v. outlet is electrically "smoothed" by C105 connected to ground.

Coil L107 is provided with a center tap connected to ground. Each end of coil L107 is connected to a line 118 through diodes D108 and D109 with the diodes being poled to conduct when the respective coil end is at a nominal +6 v. potential. Line 118 which is the +5.5 v. outlet, is connected to ground through condenser C106. Line 118 is also connected to the collector of a NPN transistor Q107. The collector of Q106 and one end of R111 is connected to the +12 v. outlet. The other end of R111 is connected to the junction of the base of Q106 and the Zener Diode ZD103 whose other end is connected to ground. The emitter of Q106 is connected to the base of Q107 and also to R110 whose other end is connected to ground. Current flowing through ZD103 causes a 5.8 v. reference potential to exist at the base of Q106 and two nominal 0.7 v. base-to-emitter drops of transistors Q106 and Q107 will create a 5.8 v. − 0.7 v. − 0.7 v. or 4.4 v. DC outlet at the emitter of Q107.

Coil L109 is connected to the input terminals of a diode bridge whose positive and negative output terminals are respectively connected to lines 120 and 122 and which positive and negative output terminals are connected by condenser C106. Lines 120 and 122 are connected by a voltage divider comprising resistances R112 and R113 connected in series. The junction between R112 and R113 is connected to the base of transistor Q108. The emitter of transistor Q108 is connected to line 120 through Zener Diode ZD102 with the Zener Diode poled to provide its design voltage drop when the potential of line 120 is higher than the potential at the emitter of transistor Q108. The emitter of transistor Q108 is connected to line 122 through a resistor R114. The collector of transistor Q108 is connected to line 122 through a resistor R114A and a condenser C107. The collector of transistor Q108 is connected to line 114 and hence to the base of transistor Q102.

Line 122 is connected to and forms part of line 112. In the circuitry just described, the series inductor L101 and the parallel capacitors C101 and C102 act to attenuate and dissipate transients which would otherwise be applied in full scale across lines 110 and 120. Diode D101 ensures that no damage will result if reverse polarity connections are made to the 72 v. locomotive battery.

The transistors Q104 and Q105 with their connections to coils L102, L103 and L104, the coils themselves, the resistances R107 and R108 and the connections to lines 110 and 112 constitute a transistor chopper.

At the time of connection of the 72 v. supply to the terminals shown, the voltage between lines 110 and 112 will start to rise toward 72 v. with line 110 positive. (Diode D101 ensures that no damage will result if reverse polarity connections are made from the 72 v. locomotive battery.) When V110—112 reaches about 8 v. this voltage, divided by resistances R107 and R108 causes one of transistors Q104 and Q105 to start conducting. As soon as one of transistors Q104 and Q105 starts conducting, the other is biased against conduction by the initial surge in its base-bias coil L102 or L104. The subsequent reversal of current in the coils L102, L103 and L014 reverses the conducting and nonconducting states in transistors Q104 and Q105, and the 'chopping' action commences with the resulting alternating current production in the flux-linked coils L105, L106, L107, L108 and L109.

The output of coil L109 is used for regulation and applied to the rectifier bridge and the output of the bridge, connected across condenser C106 filters the alternating voltage waveform. As the voltage between lines 110 and 112 approaches 12 v., approximately, Q108 will begin to conduct due to the voltage provided at its base, being the output of the diode bridge divided across resistances R112 and R113, relative to the voltage provided at Q103 emitter due to the voltage division across the Zener Diode ZD102 and resistance R114. The resulting increase in current from the positive diode bridge output through Q108 and R115 applied to the base of Q102 between R115 and R106 increases current flow through the collector-emitter circuit of transistor Q102. This current is applied to the base of Q101 and the resultant current flow through Q101 causes a drop of potential across its collector and emitter hence limiting the voltage between lines 110 and 112. The subsequent increase and decrease in potential between lines 110 and 112 conditional on decreased or increased output on coil L109 acts to regulate the input voltage to the transformer from lines 110 and 112, and the output of the coils L105 to L109 at predetermined design values.

In the event that Q108 and its associated circuitry fail in their regulating function, the voltage between lines 110 and 112 will rise from 12 v. until the 14 v. Zener Diode ZD101 at the base of Q102 starts to conduct, hence the voltage between lines 110 and 112 will, even in the event of failure of the Q108 circuitry, be limited to 14 v. plus the two base-to-emitter voltages of Q101 and Q102, i.e. approximately 16 v.

The operation of Q104 and Q105 as transistor choppers is similar to but not identical with a conventional transistor chopper as described in connection with FIG. 1. In distinction to the conventional chopper arrangement resistances R107 (680Ω) and R108 (47Ω) are connected across the potential between lines 110 and 112 with their junction connected to the bases of Q104 and Q105. When voltage is first applied to the choppers, this arrangement causes a voltage of about 0.8 v. at the base of the transistors. This is sufficient to cause conduction and assure the start of oscillation, even under heavy loads. The conventional chopper design would not do this as well. Also since base current is limited by the two resistors Q4 and Q5 will not be damaged by a temporary short circuit of the transformer secondary.

The output of coil L105 is applied to the voltage doubler comprised of diodes D102 and D103 and condensers C102 and C103 and appears between C102 and R109A as a voltage of +170 v. This voltage is tapped between R109 and the neon light NL103 to produce a voltage of 60 v.

The output of coil L106 remote from coil L107 is connected through diode D104 and to condenser C104 and produces with the component design used, a voltage of 12 v. The −12 v. supply is obtained in an analogous manner from the end of coil L108 remote from coil L107.

The 5.5 v. output from each end of the coil L107 is applied to the collector of Q107. The design voltage drop across ZD103 is arranged to provide about 5.8 v. at the base of Q106. With the design base-emitter voltage drop of 0.7 v. in Q106 and Q107 and with conduction taking place therein, a regulated 4.4 output is effectively obtained at the emitter of Q107.

The voltage output values designated, are selected for particular application to the speedometer circuitry described in my copending application Ser. No. 767,590 filed Aug. 23, 1968. However, it will be realized that these values are exemplary only and that other desired voltage outputs may be obtained within the scope of the invention but with a different selection of circuit parameters.

I claim:

1. An arrangement for supplying potentials for the operation of electronic circuitry from a railway locomotive power supply comprising: a pair of lines for respective connection to the direct current output terminals of a locomotive; means connected to said lines for eliminating transient voltage changes thereon; means connected to the output of the last-named means for converting the potentials at the said output to an alternating current signal; transformer means for transforming said alternating current; and means for rectifying the output of said transformer means; said arrangement further comprising a transistor having the emitter-collector circuit thereof connected across the input to said converting means such that an increase in current flow through said emitter-collector circuit reduces the potential applied to said converting means and a decrease in current flow through said emitter-collector circuit increases the potential applied to said converting means, a Zener Diode connected in a circuit across the input to said converting means designed to conduct when the potential across said input exceeds a predetermined desired value; and means for biasing said transistor into conduction responsive to conduction in said Zener Diode such that conduction in said Zener Diode limits the potential across said converting means.

2. An arrangement for supplying potentials for the operation of electronic circuitry from a railway locomotive power supply comprising: a pair of lines for respective connection to the direct current output terminals of a locomotive; means connected to said lines for eliminating transient voltage changes thereon; means connected to the output of the last-named means for converting the potentials at said output to alternating current signals; transformer means for transforming said alternating current signals; and means for rectifying the output of said transformer means; said arrangement further comprising a transistor having the emitter-collector circuit thereof connected across the input to said converting means such that an increase in current flow through said emitter-collector circuit reduces the potential applied to said converting means and a decrease in current flow through said emitter-collector circuits increases the potential applied to said converting means, means responsive to the output of said transformer means for controlling the biasing of said transistor, said biasing means biasing said transistor to increase conduction in response to an increased output from said transformer means and to decrease conduction in response to a decreased output from said transformer means, a Zener Diode connected in a circuit across the input to said converting means designed to conduct when the potential across said input exceeds a predetermined desired value, said predetermined desired value being higher than the potential at the input to said converting means when said biasing means acts to reduce the potential applied to said converting means; and means for biasing said transistor into conduction responsive to conduction in said Zener Diode so that said Zener Diode limits the potential across said converting means.

3. An arrangement for supplying potentials for the operation of electronic circuitry from a railway locomotive power supply comprising: a pair of lines for respective connection to the direct current output terminals of a locomotive; means connected to said lines for eliminating transient voltage changes thereon; means connected to the output of the last-named means for converting the potentials at said output to an alternating current signal; transformer means for transforming said alternating current signal; and means for rectifying the output of said transformer means; said arrangement further comprising a transistor coupled to said means for eliminating transient voltages and having the collector-emitter circuit thereof connected across one output of said transformer, rectifier means connected across said one output of said transformer means for rectifying the output of said transformer means and means for producing a voltage datum connected across said one output of said transformer means, means for connecting the rectified output of said rectifier means to ground through the series combination of a Zener Diode and a resistance, said Zener Diode being designed to be continuously conducting with the design voltage drop thereacross, and means responsive to the potential of said Zener Diode at the end thereof remote from said voltage datum for controlling the potential at the base of said transistor, the potential applied from said transformer means to the collector-emitter circuit of said transistor being selected so that said transistor is continuously conducting.